United States Patent
Lekies et al.

(10) Patent No.: US 11,640,471 B2
(45) Date of Patent: May 2, 2023

(54) DETECTING INJECTION VULNERABILITIES OF CLIENT-SIDE TEMPLATING SYSTEMS

(71) Applicant: Google LLC, Mountain View, CA (US)

(72) Inventors: Sebastian Lekies, Zurich (CH); Nicolas Golubovic, Zurich (CH)

(73) Assignee: Google LLC, Mountain View, CA (US)

( * ) Notice: Subject to any disclaimer, the term of this patent is extended or adjusted under 35 U.S.C. 154(b) by 276 days.

(21) Appl. No.: 16/981,253

(22) PCT Filed: May 4, 2018

(86) PCT No.: PCT/US2018/031147
§ 371 (c)(1),
(2) Date: Sep. 15, 2020

(87) PCT Pub. No.: WO2019/212565
PCT Pub. Date: Nov. 7, 2019

(65) Prior Publication Data
US 2021/0044617 A1 Feb. 11, 2021

(51) Int. Cl.
*H04L 9/40* (2022.01)
*G06F 21/57* (2013.01)
*G06F 9/54* (2006.01)

(52) U.S. Cl.
CPC .......... *H04L 63/1466* (2013.01); *G06F 9/547* (2013.01); *G06F 21/577* (2013.01); *H04L 63/1433* (2013.01); *G06F 2221/033* (2013.01)

(58) Field of Classification Search
None
See application file for complete search history.

(56) References Cited

U.S. PATENT DOCUMENTS 8,966,446 B1 * 2/2015 Amacker .............. H04L 67/563
717/124
9,262,311 B1 * 2/2016 Johnston ............. G06F 11/3696
(Continued)

FOREIGN PATENT DOCUMENTS

CN 106155877 A 11/2016

OTHER PUBLICATIONS

Winch, Rob, "AngularJS—Escaping the Expression Sandbox for XSS", blog post, Jan. 28, 2016, <https://spring.io/blog/2016/01/28/angularjs-escaping-the-expression-sandbox-for-xss>, 5 pages. (Year: 2016).*

(Continued)

*Primary Examiner* — Michael Pyzocha
(74) *Attorney, Agent, or Firm* — Honigman LLP; Brett A. Krueger

(57) ABSTRACT

A method (800) for detecting an injection vulnerability of a client-side templating system includes receiving a web page (200), determining that the web page implements an interpreted programming language framework (142) with client-side templating, and extracting a version (144) of the interpreted programming language framework and an interpolation sign (146) from the web page. The method also includes generating an attack payload (152*a*) for at least one injection vulnerability context (210) of the web page based on the version of the interpreted programming language framework and the interpolation sign, instrumenting the web page to inject the attack payload into the at least one injection vulnerability context of the web page, and executing the instrumented web page.

34 Claims, 10 Drawing Sheets

(56) References Cited

U.S. PATENT DOCUMENTS

| | | | |
|---|---|---|---|
| 10,621,347 B2* | 4/2020 | Takata | H04L 63/1441 |
| 2002/0097268 A1* | 7/2002 | Dunn | G06F 11/2294 |
| | | | 715/239 |
| 2005/0273860 A1 | 12/2005 | Chess et al. | |
| 2009/0193497 A1* | 7/2009 | Kikuchi | H04L 63/14 |
| | | | 726/1 |
| 2010/0218253 A1* | 8/2010 | Sutton | G06F 21/554 |
| | | | 726/23 |
| 2010/0299754 A1* | 11/2010 | Amit | H04L 63/14 |
| | | | 703/13 |
| 2011/0185271 A1* | 7/2011 | Aciicmez | G06F 21/563 |
| | | | 715/256 |
| 2012/0198558 A1* | 8/2012 | Liu | G06F 21/53 |
| | | | 726/25 |
| 2013/0007885 A1* | 1/2013 | Haviv | H04L 63/1433 |
| | | | 726/25 |
| 2013/0091578 A1* | 4/2013 | Bisht | G06F 21/53 |
| | | | 726/25 |
| 2013/0111595 A1* | 5/2013 | Amit | G06F 21/566 |
| | | | 726/25 |
| 2013/0247204 A1* | 9/2013 | Schrecker | H04L 45/306 |
| | | | 726/25 |
| 2013/0290786 A1* | 10/2013 | Artzi | G06F 11/3684 |
| | | | 714/E11.207 |
| 2013/0312094 A1* | 11/2013 | Zecheru | H04L 63/1433 |
| | | | 726/25 |
| 2014/0351796 A1* | 11/2014 | Gur-esh | G06F 11/3644 |
| | | | 717/126 |
| 2014/0373158 A1* | 12/2014 | Hay | G06F 21/577 |
| | | | 726/25 |
| 2015/0007251 A1* | 1/2015 | Johns | H04L 63/168 |
| | | | 726/1 |
| 2015/0096006 A1* | 4/2015 | Chu | G06F 21/128 |
| | | | 726/9 |
| 2015/0101057 A1* | 4/2015 | Fingold | H04L 63/1433 |
| | | | 726/25 |
| 2015/0163237 A1* | 6/2015 | Pistoia | H04L 63/1433 |
| | | | 726/25 |
| 2015/0309813 A1 | 10/2015 | Patel | |
| 2016/0055073 A1* | 2/2016 | Saltzman | H04L 63/14 |
| | | | 717/130 |
| 2016/0078221 A1* | 3/2016 | Kaplan | G06F 21/51 |
| | | | 726/25 |
| 2016/0147992 A1* | 5/2016 | Zhao | G06F 21/50 |
| | | | 726/22 |
| 2017/0034023 A1* | 2/2017 | Nickolov | H04L 43/0817 |
| 2017/0177866 A1* | 6/2017 | Hentunen | G06F 21/563 |
| 2017/0277892 A1* | 9/2017 | MacDermid | H04L 63/1466 |
| 2017/0293477 A1* | 10/2017 | Takata | G06F 8/42 |
| 2017/0331850 A1* | 11/2017 | Li | G06F 11/3608 |
| 2018/0063180 A1* | 3/2018 | Williams | G06F 8/35 |
| 2018/0063190 A1* | 3/2018 | Wright | H04L 63/1425 |
| 2018/0300480 A1* | 10/2018 | Sawhney | G06N 20/00 |
| 2018/0349602 A1* | 12/2018 | Johns | G06F 21/552 |
| 2018/0349611 A1* | 12/2018 | Smith | H04L 63/1441 |
| 2019/0303584 A1* | 10/2019 | Yang | G06F 7/02 |
| 2019/0356675 A1* | 11/2019 | Takata | G06F 8/72 |
| 2020/0065480 A1* | 2/2020 | Gu | G06F 21/64 |
| 2020/0201987 A1* | 6/2020 | Kanemoto | G06F 21/55 |

OTHER PUBLICATIONS

We45, "Template Injection in AngularJS" we45 blog, Apr. 9, 2017, <https://www.we45.com/post/template-injection-in-angularjs>, 3 pages. (Year: 2017).*

Heyes, Gareth, "XSS without HTML: Client-Side Template Injection with AngularJS", blog post, Jan. 27, 2016, <https://portswigger.net/research/xss-without-html-client-side-template-injection-with-angularjs>, 12 pages. (Year: 2016).*

International Search Report and Written Opinion for the related PCT Application. PCT/US2018/031147 dated Aug. 6, 2018.

* cited by examiner

DETECTING INJECTION VULNERABILITIES OF CLIENT-SIDE TEMPLATING SYSTEMS

TECHNICAL FIELD

This disclosure relates to detecting injection vulnerabilities of client-side templating systems.

BACKGROUND

Modern interpreted programming language frameworks (such as JavaScript) introduce novel functionality into web applications. One functionality that became popular in frameworks, such as AngularJS, Polymer, Aurelia, or Ractive are client-side expression languages. Expressions make it easy to define user interfaces in a declarative way. In these expressions, certain symbols mark the beginning and the end of an expression. To standard web browsers, these symbols are meaningless, and therefore, the browser interprets the symbols as text. However, modern interpreted programming language frameworks parse the content of the web page, and if they encounter these so-called interpolation signs (the symbols), the frameworks interpret the content with a custom expression parser. The interpretation of expressions happens on the client-side in the user's browser. Accordingly, frameworks implicitly trust an expression in the sense that applications interpret the expressions as code. Controlling an expression is thus equivalent to being able to execute code in the context of the web application.

Expressions are a functionality that require web developers to adopt a new philosophy for development. Instead of dynamically generating Hypertext Markup Language (HTML) on the server-side, developers now need to serve static templates and interpolate user input into it on the client-side. However, since many developers are not experienced with this, they instead dynamically generate templates on-the-fly by incorporating user input on the server-side. When a template gets loaded in an application with a modern interpreted programming language framework, the framework scans the template for interpolation signs and expressions. This allows for a Cross-Site Scripting injection vulnerability. These vulnerabilities are particularly severe since they bypass common Cross-Site Scripting mitigations schemes.

SUMMARY

One aspect of the disclosure provides a method for detecting vulnerabilities of client-side templating systems. The method includes receiving, at data processing hardware, an application. The method also includes determining, by the data processing hardware, whether the application runs a programming language with client-side templating. The programming language may be an interpreted programming language (e.g., JavaScript). The method includes generating, at the data processing hardware, an attack payload and instrumenting, by the data processing hardware, the application to inject the attack payload. The method also Includes executing, at the data processing hardware, the application.

Another aspect of the disclosure provides a method for detecting injection vulnerabilities of client-side templating systems. The method includes receiving, at data processing hardware, a web page, and determining, by the data processing hardware, that the web page implements a interpreted programming language framework with client-side templating. The interpreted programming language may be JavaScript. The method also includes extracting, by the data processing hardware, a version of the interpreted programming language framework and an interpolation sign from the web page, generating, by the data processing hardware, an attack payload for at least one injection vulnerability context of the web page based on the version of the interpreted programming language framework and the interpolation sign, and instrumenting, by the data processing hardware, the web page to inject the attack payload into the at least one injection vulnerability context of the web page. The method also includes executing the instrumented web page.

Implementations of the disclosure may include one or more of the following optional features. In some implementations, the method also includes catching, by the data processing hardware, a thrown exception triggered by the attack payload during execution of the instrumented web page, and identifying, by the data processing hardware, a vulnerability of the web page based on the thrown exception. In some examples, the method also includes modifying, by the data processing hardware, an exception handler of the interpreted programming language framework to intercept the thrown exception. Optionally, the thrown exception may include a syntax exception.

In some implementations, the attack payload includes a validation function configured to validate execution of the validation function to the data processing hardware. The method may include catching, by the data processing hardware, a response of the validation function trigged by the attack payload during execution of the instrumented web page. The method may also include identifying, by the data processing hardware, a vulnerability of the web page based on the response. In some implementations, extracting the interpolation sign from the web page includes executing, by the data processing hardware, the web page to expose an Application Programming Interface (API) of the interpreted programming language framework. The method may also include modifying, by the data processing hardware, the API and intercepting a reconfiguration of the interpolation sign using at least the modified API.

In some examples, generating the attack payload includes generating a single attack payload configured for instrumentation into the web page for each injection vulnerability context of the web page. Instrumenting the web page to inject the attack payload may include injecting, by the data processing hardware, the attack payload into a possible input vector of the web page. In some implementations, instrumenting the web page to inject the attack payload includes generating, by the data processing hardware, a separate test case for each possible input vector of the web page and injecting, by the data processing hardware, the attack payload into the respective possible input vector of each test case. Optionally, executing the instrumented web page includes executing the instrumented web page for each test case.

In some implementations, the method includes determining, by the data processing hardware, whether a vulnerability of the web page is identified during execution of the web page. When the vulnerability of the web page is identified, the method includes, by data processing hardware, generating a second attack payload based on the version of the interpreted programming language framework and the vulnerability of the web page. The second attack payload includes a user notification indicating the vulnerability of the web page. The method also includes injecting, by the data processing hardware, the second attack into the web page and transmitting the web page having the injected second attack payload from the data processing hardware to a user device requesting the web page. The web page, when received by the user device, causes the user device to execute the web page and display the user notification on a user interface executing on the user device. Optionally, instrumenting the web page to inject the attack payload includes injecting the attack payload using prototypical inheritance.

Another aspect of the disclosure provides a system including data processing hardware and memory hardware in communication with the data processing hardware. The memory hardware stores instructions that when executed on the data processing hardware cause the data processing hardware to perform operations. The operations include receiving a web page, and determining that the web page implements a interpreted programming language framework with client-side templating. For example, the interpreted programming language is JavaScript. The operations also include extracting a version of the interpreted programming language framework and an interpolation sign from the web page, generating an attack payload for at least one injection vulnerability context of the web page based on the version of the interpreted programming language framework and the interpolation sign, and instrumenting the web page to inject the attack payload into the at least one injection vulnerability context of the web page. The operations also include executing the instrumented web page.

Implementations of the disclosure may include one or more of the following optional features. In some implementations, the operations also include catching a thrown exception triggered by the attack payload during execution of the instrumented web page, and identifying a vulnerability of the web page based on the thrown exception. In some examples, the operations also include modifying an exception handler of the interpreted programming language framework to intercept the thrown exception. Optionally, the thrown exception may include a syntax exception.

In some implementations, the attack payload includes a validation function configured to validate execution of the validation function to the data processing hardware. The operations may include catching a response of the validation function trigged by the attack payload during execution of the instrumented web page. The operations may also identify a vulnerability of the web page based on the response. In some implementations, extracting the interpolation sign front the web page includes executing the web page to expose an Application Programming Interface (API) of the interpreted programming language framework. The operations may also modify the API and intercept a reconfiguration of the interpolation sign using at least the modified API.

In some examples, generating the attack payload includes generating a single attack payload configured for instrumentation into the web page for each injection vulnerability context of the web page. Instrumenting the web page to inject the attack payload may include injecting the attack payload into a possible input vector of the web page. In some implementations, instrumenting the web page to inject the attack payload includes generating a separate test case for each possible input vector of the web page and injecting the attack payload into the respective possible input vector of each test case. Optionally, executing the instrumented web page includes executing the instrumented web page for each test case.

In some implementations, the operations include determining whether a vulnerability of the web page is identified during execution of the web page. When the vulnerability of the web page is identified, the operations generate a second attack payload based on the version of the interpreted programming language framework and die vulnerability of the web page. The second attack payload includes a user notification indicating the vulnerability of the web page. The operations also inject the second attack into the web page and transmit the web page having the injected second attack payload from the data processing hardware to a user device requesting the web page. The web page, when received by the user device, causes the user device to execute the web page and display the user notification on a user interface executing on the user device Optionally, instrumenting the web page to inject the attack payload includes injecting the attack payload using prototypical inheritance.

Another aspect of the disclosure provides another method for detecting injection vulnerabilities of client-side templating systems. The method includes requesting, at data processing hardware, a web page. The method also includes receiving, at the data processing hardware, the web page having an attack payload injected into a vulnerability context of the web page and determining, by the data processing hardware, that the web page implements a interpreted programming language framework, such as a JavaScript framework, with client-side templating. The method also includes executing, by the data processing hardware, the web page and generating, by the data processing hardware, a notification triggered by the attack payload, the notification indicating a vulnerability of the web page.

This aspect may include one or more of the following optional features. In some implementations, the method includes where the attack payload is based on a version of the interpreted programming language framework and an interpolation sign from the web page. In some examples, the method includes where the attack payload is injected into the vulnerability context of the web page using prototypical inheritance. In some implementations, the vulnerability is based on the vulnerability context of the web page.

Another aspect of the disclosure provides a system including data processing hardware, memory hardware in communication with the data processing hardware. The memory hardware stores instructions that when executed on the data processing hardware cause the data processing hardware to perform operations. The operations include requesting, at data processing hardware, a web page. The operations also include receiving the web page having an attack payload injected into a vulnerability context of the web page and determining that the web page implements a interpreted programming language framework with client-side templating. The interpreted programming language may be JavaScript. The operations also include executing the web page and generating a notification triggered by the attack payload, the notification indicating a vulnerability of the web page.

This aspect, may include one or more of the following optional features. In some implementations, the operations include where the attack payload is based on a version of the interpreted programming language framework and an interpolation sign from the web page. In some examples, the operations include where the attack payload is injected into the vulnerability context of the web page using prototypical inheritance. In some implementations, the vulnerability is based on the vulnerability context of the web page.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
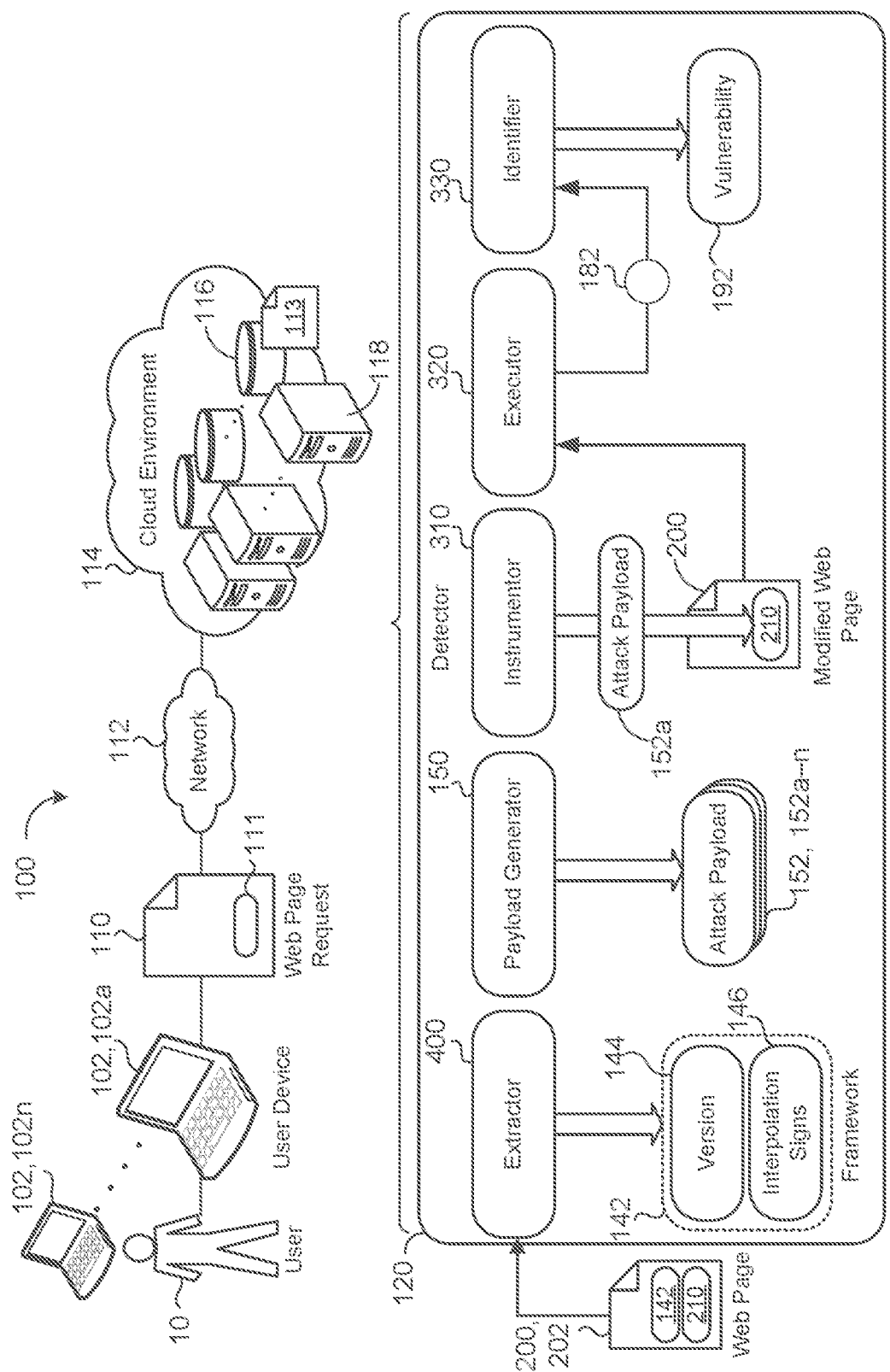
FIG. 1 is a schematic view of an example system for detecting injection vulnerabilities of client-side templating systems.

Modern interpreted programing language (e.g., JavaScript) frameworks include the possibility to include client-side expressions that make defining user interfaces more efficient. These client-side expressions, however, may be vulnerable to attack by allowing a third party to inject and run functions or code at the client's device. These vulnerabilities could potentially allow a third party to access a device and information contained on it. This ability to inject and run code is not detected by Cross-Site Scripting mitigations and bypasses current security scanners. Accordingly, the technical problem to be solved is how to avoid such vulnerabilities in client-side templating systems and thereby improve security of web pages and client devices. The present disclosure solves the technical problem by identifying potential vulnerabilities, generating and injecting attack payloads to determine actual vulnerabilities, and alerting the user to the actual vulnerabilities.

Implementations herein are directed toward a detector configured to determine/detect whether a web page implementing an interpreted programming language framework with client-side templating is vulnerable to injection attacks. A user may request a web page implementing a interpreted programming language framework through a web page browser. A interpreted programming language framework, such as a JavaScript framework like AngularJS, Polymer, Aurelia, or Ractive, is associated with a version and with interpolation signs. Interpolation signs mark the beginning and end of an expression. For example, in AngularJS framework, the interpolation signs default to {{and}}. Therefore, the expression <h1>Hi {{customer.name}}</h1> would be parsed by the framework and would look up the "customer" object inside the scope of the application and lookup the "name" of the customer. As a result, the framework would present the following to the browser (assuming the name attribute is set to customer1): <h1>Hi customer1</h1>.

Such expressions, however, allow for the injection of vulnerabilities. For example, the following PHP code is safe when executed without client-side JavaScript frameworks:
<?php echo "<h1>Hi".htmlentities($_GET['username'])."</h1>?>

However, if this template is loaded in an application with a JavaScript framework, the template may be scanned for interpolation signs and expressions. If the username parameter in the example contains interpolations signs (which are not encoded by htmlentities), the framework may execute the contained expression as code. If the username, for example, is {{constructor.constructor("alert(1)")}} then the JS framework may call the alert function. In this case alert(1) serves as an example for an arbitrary payload that an attacker can execute. This is a form of cross-site scripting.

To simulate this, in some examples, the detector injects an attack payload into an injection vulnerability context of the web page and the web page executes the payload during execution of the web page. The detector may configure the attack payload to deliver a notification to the user requesting the web page that warns the user of the vulnerability from the injection vulnerability context.

Referring to FIG. 1, in some implementations, an example system 100 includes one or more user devices 102, 102a-n each associated with a respective user 10 and in communication with a remote system 114 via a network 112. Each user device 102 may correspond to a computing device, such as a desktop workstation or laptop workstation. The remote system 114 may be a single computer, multiple computers, or a distributed system (e.g., a cloud environment) having scalable/elastic computing resources 118 (e.g. data processing hardware) and/or storage resources 116 (e.g., memory hardware). The user 10 may request a web page 200 from the remote system 114 by sending a web page request 110 over the network 112 from the user device 102 to the remote system 114. The web page request 110 may include a web page identifier 111 that identifies the requested web page 200 or identifies multiple web pages 200 associated with a web application 202. The web page identifier 111 may, for example, be a web page/application Uniform Resource Locator (URL) or Internet Protocol (IP) address that identifies the web page 200 or web application 202.

In some implementations, the data processing hardware 118 of the remote system 114 executes a detector 120 that receives the requested web page 200, and when the web page 200 implements an interpreted programming language framework 142 (e.g., JavaScript) with client-side templating, determines whether the web page 200 is vulnerable to an injection attack before returning the web page 200 to the user device 102. In other implementations, the detector 120 executes on the user device 102 and determines whether the requested web page 200 is vulnerable to an attack prior to loading the web page 200 for the user 10 to view.

In some examples, the detector 120 is configured to determine whether one or more web pages 200 among multiple web pages 200 requested by a user device 102 are vulnerable to an attack. For example, the user 10 may send the web page request 110 for multiple web pages 200 associated with a corresponding web application 202 and the detector 120 may determine/detect the vulnerabilities of each web page 200 of the associated web application 202. In some examples, the detector 120 determines/detects whether web pages 200 are vulnerable to attacks responsive to receiving corresponding web page requests 110. In other examples, the detector 120 initially determines/detects web pages 200 that are vulnerable to attacks prior to receiving corresponding web page requests 110 from user devices 102.

In these examples, the detector 120 stores a record 113 in the memory hardware 116 that indicates which web pages 200 are vulnerable to attacks and accesses the record 113 once a web page request 110 is received from a user device 102.

In some implementations, the detector 120 implements an extractor 400 that receives the requested web page 200 implementing the interpreted programming language framework 142 with client-side templating and extracts an interpreted programming language version 144 and interpolation signs 146 from the interpreted programming language framework 142. A payload generator 150 generates an attack payload 152a for one or more injection vulnerability contexts 210 of the web page 200 using the interpreted programming language version 144 and interpolation signs 146. Thereafter, an instrumentor 310 instruments the web page 200 by injecting the attack, payload 152 generated by the payload generator 150 into each vulnerability context 210 of the web page 200 and an executor 320 executes the instrumented web page 200 (e.g., modified web page 200). In some examples, executing the modified web page 200 causes the modified web page 200 to throw an exception 182. In these examples, an identifier 330 may catch the thrown exception 182 and identify a vulnerability 192 of the web page 200 based on the thrown exception 182.

Figure 2:
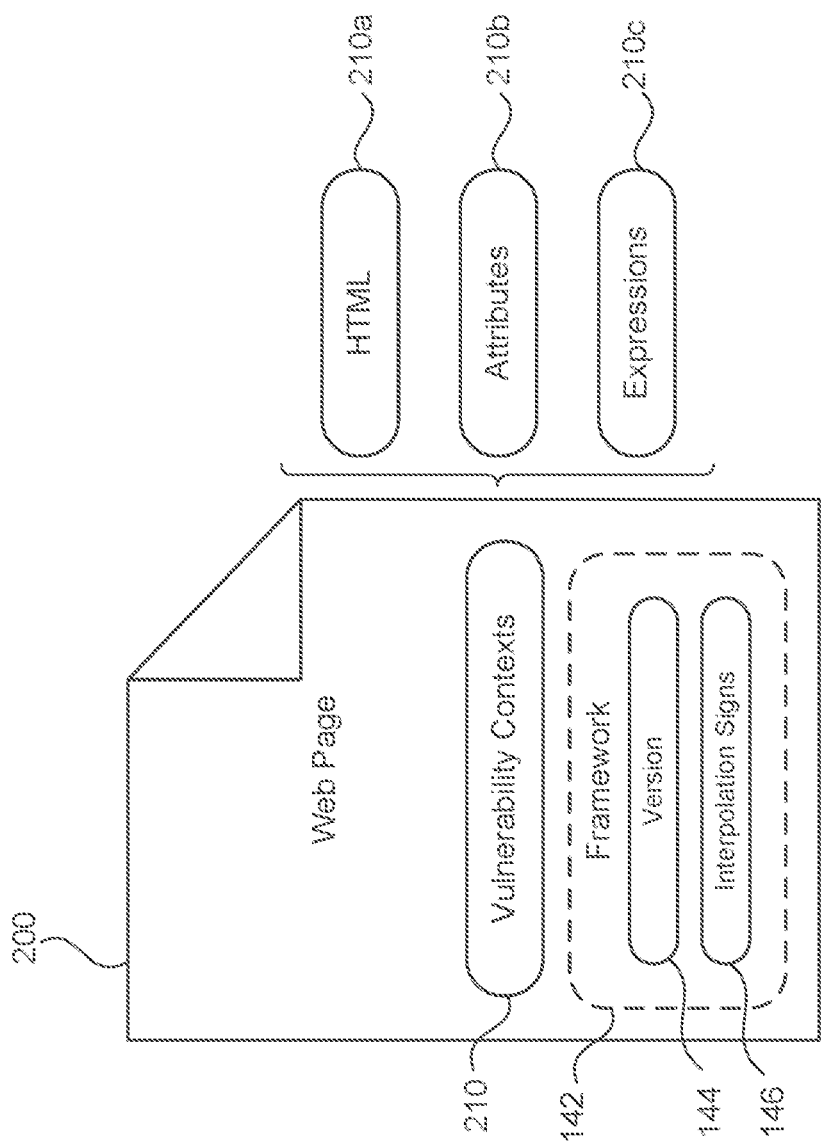
FIG. 2 is a schematic view of an example webpage associated with client-side templating systems.

FIG. 2 shows an example web page 200 implementing an interpreted programming language framework 142 with client-side templating. The interpreted programming language framework 142 has an associated interpreted programming language version 144 an associated interpolation signs 146. The interpreted programming language version 144 refers to a unique version name or version number assigned to the interpreted programming language framework 142 release. Different versions of the same interpreted programming language framework 142 may provide different functionality or features and the version 144 may be necessary to properly access or otherwise use the interpreted programming language framework 142. The interpolation signs 146 are specific symbols used by the interpreted programming language framework 142 to recognize client-side expressions that the browser otherwise ignores (or treats as mere text). For example, the interpreted programming language framework 142 may parse the web page 200, looking for interpolation signs 146, and execute the expression found within the symbols. Interpolation signs 146 can take the form of any symbol that the browser otherwise would ignore. Interpolation signs 146 may, for example, be { }, [[ ]], or // //. The web page 200 may also be associated with one or more vulnerability contexts 210. The vulnerability contexts 210 represent potential avenues for injection attacks. Each interpreted programming language framework 142 may have a different set of injection vulnerability contexts 210. The vulnerability contexts 210 may, for example, include plain HTML 210a (e.g., <h1>Hello "injection here"</h1>), attributes 210b (e.g., <div ng-if="injection here"></div>), and existing expressions 210c (e.g., <h1>Hello {{injection vulnerability}}</h1>). These contexts 210, when injected with the attack payload 152a, may allow the interpreted programming language framework 142 to execute the attack payload 152a.

Figure 3:
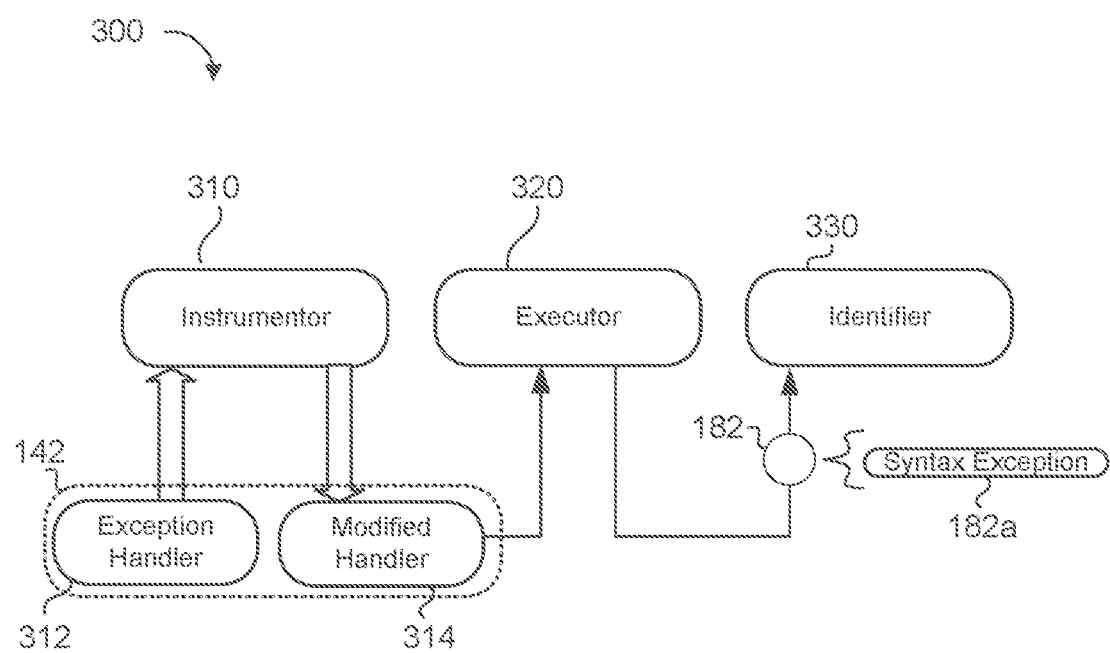
FIG. 3 is a schematic view of example components of an instrumentor, an executor, and an identifier of the system of FIG. 1.

FIG. 3 shows a schematic view 300 of the instrumentor 310 instrumenting the web page 200, in part, by modifying an exception handler 312 of the interpreted programming language framework 142. The exception handler 312 of the interpreted programming language framework 142 may intercept exceptions 182 triggered by the attack payload 152a during execution of the instrumented web page 200. These handlers 312, however, often obscure the thrown exceptions 182 from generic error handlers (such as window.onerror), thereby allowing the thrown exception 182 to go undetected during execution of the web page 200. Accordingly, the instrumentor 310 may modify the exception handler 312 to generate a modified exception handler 314 that ensures any exceptions 182 thrown during execution of the web page 200 are identified by the identifier 330. Specifically, executing the web page 200 with the modified exception handler 314 of the interpreted programming language framework 142 by the executor 320 allows the identifier 330 to intercept a thrown exception 182 and determine if the thrown exception 182 was triggered by the attack payload 152a injected into the vulnerability context 210. The thrown exception 182 may include, for example, a syntax or parsing exception 182a. The identifier 330 may first parse the exception 182 to determine if the attack payload 152a triggered the exception 182. If so, the identifier 330 may confirm that the web page 200 requested by the user device 102 includes a vulnerability 192.

Figure 4:
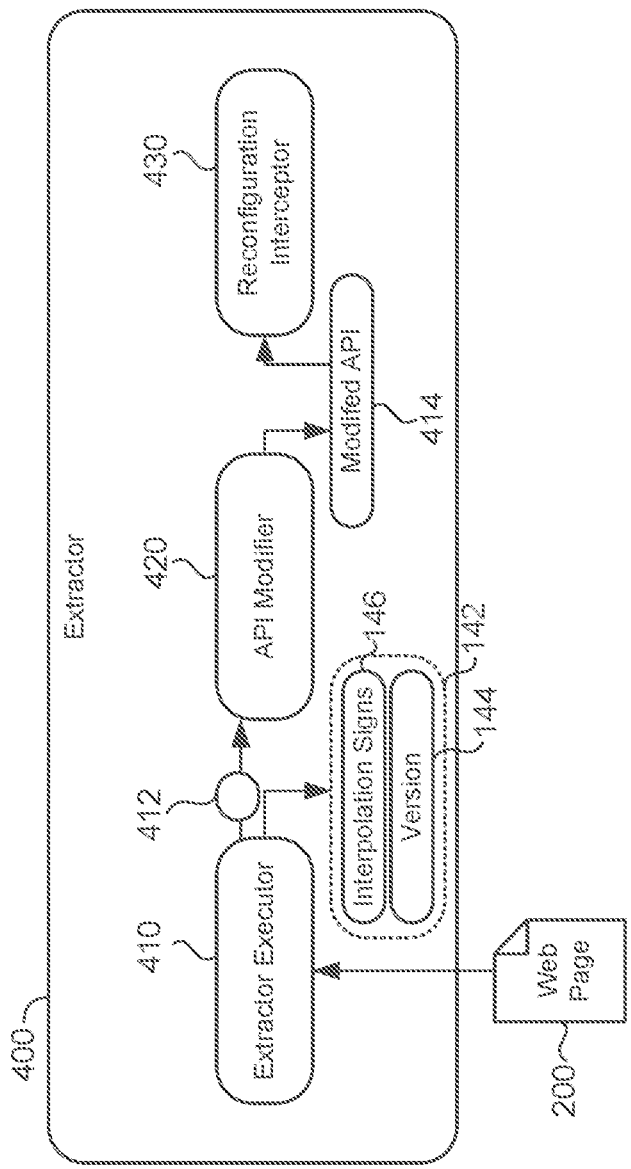
FIG. 4 is a schematic view of example components of an extractor of the system of FIG. 1.

Some interpreted programming language frameworks 142 allow for the reconfiguration of interpolation signs 146. Put another way, a developer of a web page 200, may program the web page 200 to change the symbols used for interpolation signs 146. This change may occur multiple times and in multiple places throughout the web page 200 design. Referring to FIG. 4, the extractor 400 receives the web page 200 from the remote system 114, and if the web page 200 implements a interpreted programming language framework 142 with client-side templating, the extractor 400 extracts the interpreted programming language framework version 144 and the interpolation signs 146. In some implementations, the extractor 400 implements an extractor executor 410 that executes the web page 200 to expose an Application Programming Interface (API) 412 of the interpreted programming language framework 142. Thereafter, a modifier 420 may modify the exposed API 412 and output a modified API 414. A reconfiguration interceptor 430 may use She modified API 414 to detect a reconfiguration of the interpolation signs 146.

Figure 5:
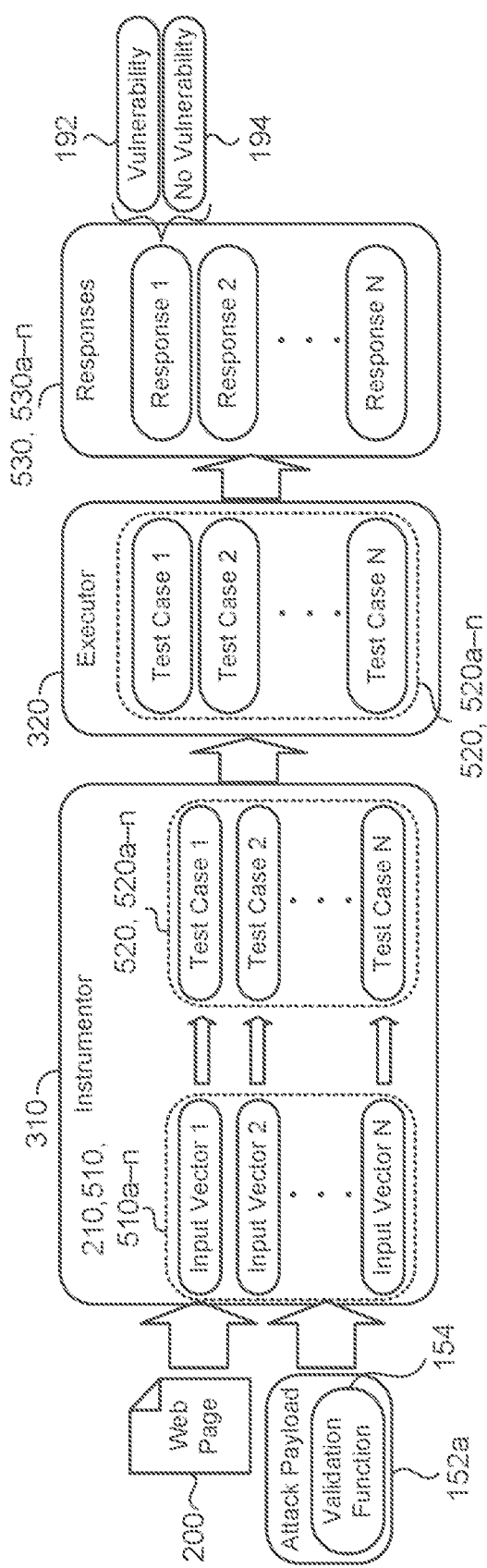
FIG. 5 is a schematic view of example components of an instrumentor and an executor of the system of FIG. 1.

Referring to FIG. 5, a schematic view 500 shows the instrumentor 310 instrumenting the web page 200 by injecting the attack payload 152a into each vulnerability context 210. The instrumentor 310 may inject the attack payload 152a through prototypical inheritance. For example, the instrumentor 310 may add a function to an JavaScript Object prototype from which generally all JavaScript objects, including scopes, inherit. This function may generally be available in all expression scopes and may notify the detector 120 when the attack payload 152a was successful. The attack payload 152a may include a validation function 154. The detector 120 may configure the validation function 154 to validate execution of the validation function 154. Put another way, the validation function 154 may be self-validating by alerting the detector 120 when the validation function 154 execute. For example, the detector 120 may wait for a call from the validation function 154. The instrumentor 310 injects the attack payload 152a with the validation function 154 into one or more possible input vectors 510, 510a-n associated with corresponding injection vulnerability contexts 210 of the web page 200. Possible input vectors 510 include, for example, text boxes, URLs, buttons, lists, and other input devices.

In some implementations, the payload generator 150 generates a single attack payload 152a for injection into each possible input vector 510 (i.e., each injection vulnerability context 510) of the web page 200 via instrumentation by the instrumentor 330 to generate corresponding test cases 520, 520a-n. While the payload generator 150 may generate a separate attack payload 152 for each vulnerability context 210 (i.e., for each possible input vector 510), generating a single attack payload 152a for injection into all of the input vectors 510 increases speed and efficiency of the detector 120. For example, if the payload may be injected into HTML 210a, attribute 210b, and expression 210c, the attack payload may be (for AngularJS):

validationFunction('{{validationFunction( )}}')

This attack payload 152a may be executed in all three vulnerability contexts 210. For HTLM 210a, the interpreted programming language framework 142 may execute the inner part of the expression 210a and therefore execute the attack payload 152a. For attribute 210b, the inner expression is treated as a string parameter of the outer function call, so the outer function is called, which results in the attack payload 152a again being executed. For expression 210c, the first pair of closing interpolation signs 146 may end the expression 210c. As a result, the parsed expression may cause a syntax exception 182a, which may be caught by the detector 120.

Therefore, as each test case 520 is associated with a corresponding possible input vector 510, each test case 520 is indicative of the web page 200 having the attack payload 152a injected into the respective possible input vector 510. The detector 120 may use fuzzing techniques to inject the attack payload 152a into the possible input vectors 510. Such fuzzing techniques may make use of automated software testing that inserts pseudo-random data into a program, application, web page, or the like.

After instrumenting the web page 200 with the attack payload 152 injected into the input vectors 510, the executor 320 may execute each test case 520 and output a corresponding response 530, 530a-n indicating whether the corresponding test case 520 is associated with a vulnerability 192 or no vulnerability 194. The detector 120 may base the response 530 on the validation function 154 of the attack payload 152a that triggers during execution of the test case 520. For example, the response 530 may validate execution of the validation function 154 in order to identify a vulnerability 192 of the web page 200. Using fuzzing technology to generate test cases 520 for execution in a browser may simulate execution of code in a realistic environment. In this way, the detector 120 can explore realistic injection vulnerabilities.

Figure 6:
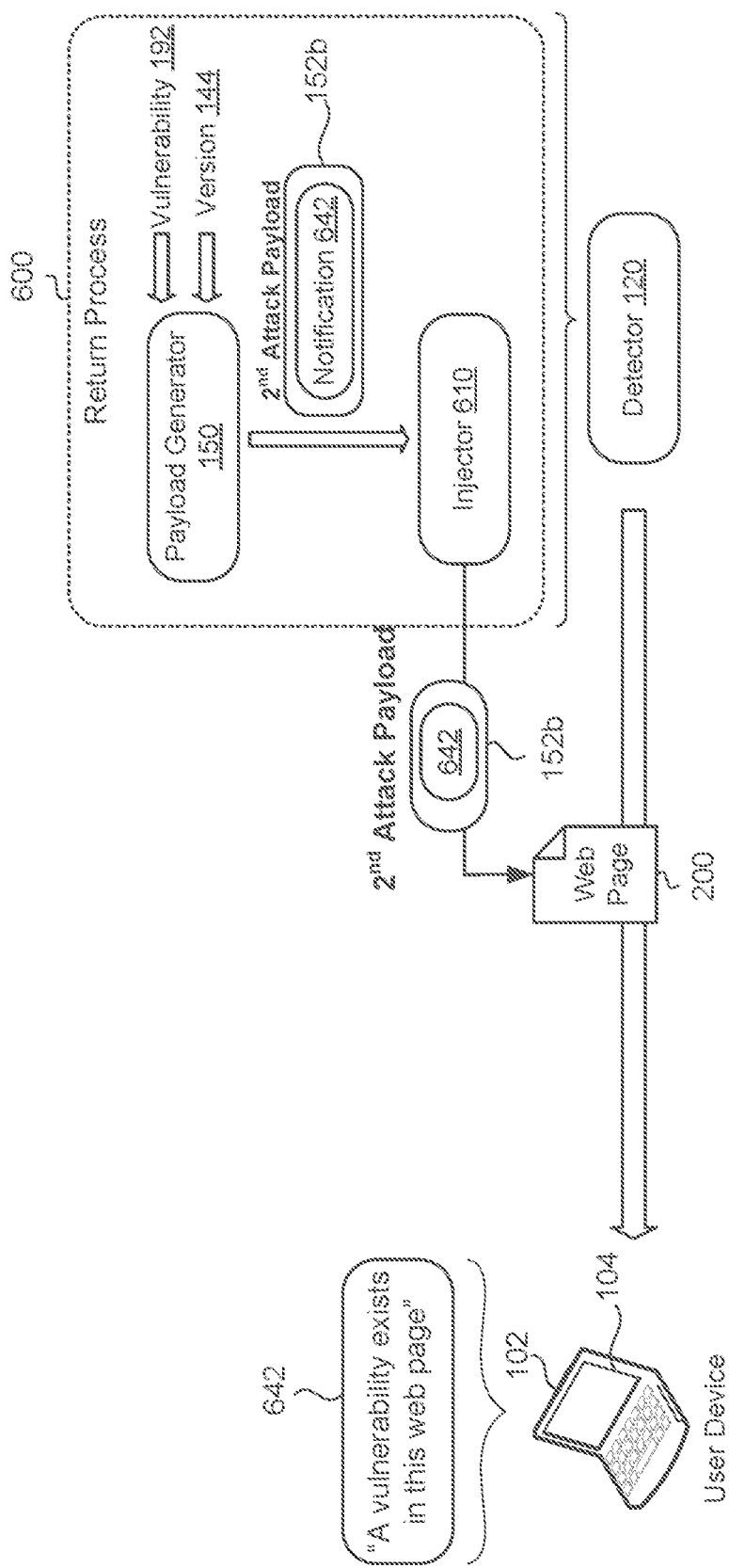
FIG. 6 is a schematic view of example components of a return process.

FIG. 6 shows the detector 120 executing a return process 600 for returning a web page 200 requested by a user device 102 when the detector 120 identifies a vulnerability 192 of the web page 200. For example, the user device 102 may send the web page request 110 for the web page 200 and the identifier 330 may identify the vulnerability 192 of the web page 200 based on a thrown exception 182, as discussed above in FIG. 1. In the example shown, the return process 600 causes the payload generator 150 to generate a second attack payload 152b based on the version 144 of the interpreted programming language framework 142 and the vulnerability 192 of the web page 200. The second attack payload 152b includes a user notification 642 that indicates the vulnerability 192 of the web page 200 previously identified. Since the detector 120 already identified the vulnerability 192 of the web page 200, there is no need to instrument the web page 200 a second time to inject the second attack payload 152b into the injection vulnerability contexts) 210. Instead, the return process 600 employs an injector 610 that injects the second attack payload 152b directly into the vulnerability 192 of web page 200.

After injecting the second attack payload 152b into the web page 200, the return process 600 transmits the web page 200 having the injected second attack payload 152b to the user device 102. In response to receiving the web page 200, the user device 102 may execute the web page 200. In some examples, the user device 102 executes a user interface (e.g., a graphical user interface (GUI)) 104 that displays the user notification 642 during execution of the web page 200 on the user device 102. Accordingly, display of the user notification 642 on the user interface 104 may include a dialog box, pop-up window, glyph or other graphic that informs the user 10 of the vulnerability 192 of the web page 200. Additionally or alternatively, the user notification 642 may include an audio alert (e.g., speech utterance) that indicates the vulnerability 192 of the web page 200. In some implementations, the second attack payload 152b injected into the web page 200 is configured to trigger presentation (e.g., display/audio) of the user notification 642 on the user interface 104 upon executing the web page 200 on the user device 102.

Figure 7:
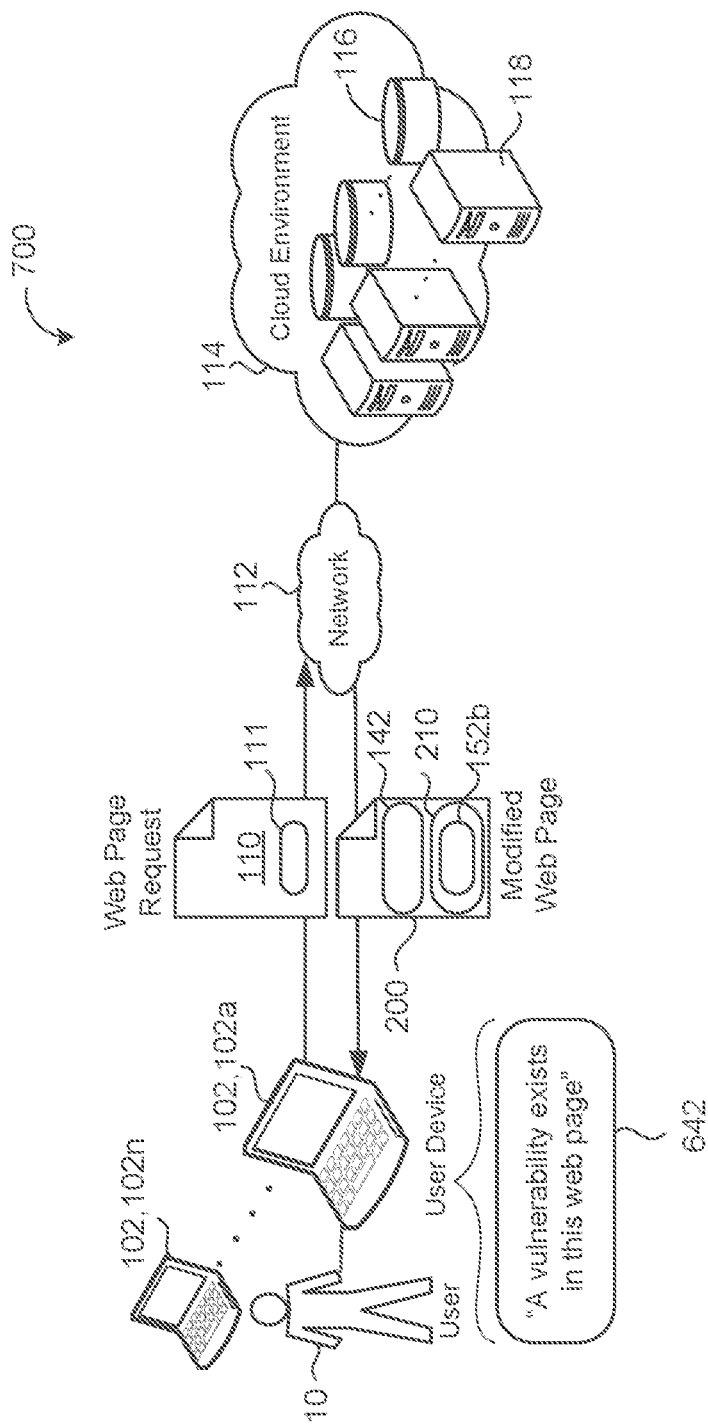
FIG. 7 is a schematic view of another example system for detecting injection vulnerabilities of client-side templating systems.

Referring to FIG. 7, in some implementations, an example system 700 includes one or more user devices 102, 102a-n each associated with a respective user 10 and in communication with the remote system 114 via the network 112. The remote system 114 may return a requested web page 200 to the user device 102 after receiving the web page request 110 that includes the identifier 111 identifying the web page 200. In the example shown, the second attack payload 152b is injected into the vulnerability context of the web page 200. The attack payload 152b may be injected using prototypical inheritance. The user device 102 may then determine that the web page 200 implements a interpreted programming language framework 142 with client-side templating. The attack payload 152b may be based on the version 144 of the interpreted programming language framework 142 and an interpolation sign 146 from the web page 200. The web page 200 when received by the user device 102 may cause the user device 102 to execute the web page 200 and generate a notification 642 triggered by the second attack payload 152b during execution of the web page 200. The notification 642 may graphically display a warning indicating a vulnerability 192 of the web page 200. Specifically, the notification 642 may warn of the vulnerability 192 based on or exploited by the attack payload 152b. The notification 642 may additionally or alternatively include an audio alert/warning indicating the vulnerability 192 of the web page 200.

Figure 8:
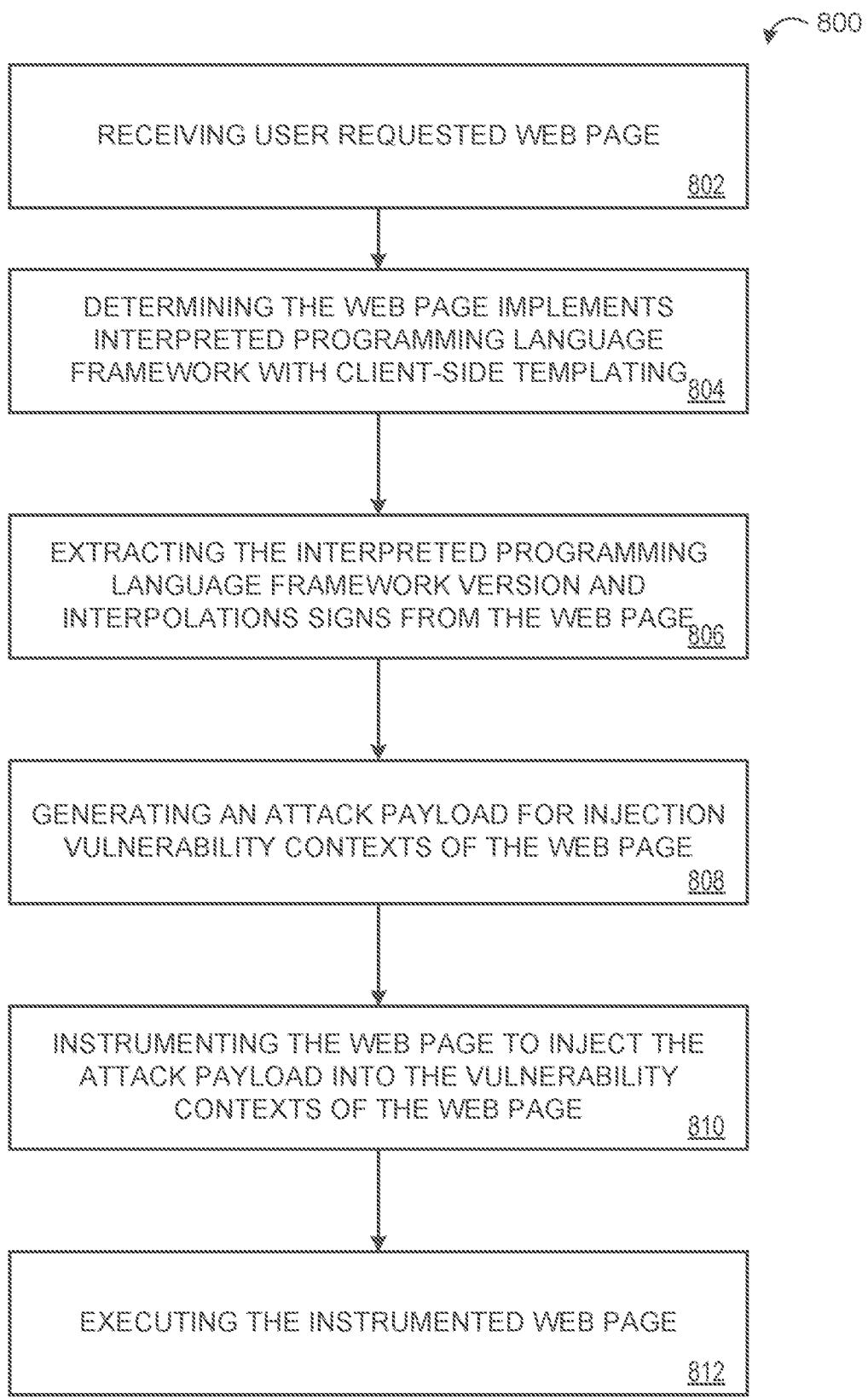
FIG. 8 is a flowchart of an example method for detecting injection vulnerabilities of client-side templating systems.

FIG. 8 is a flowchart of an example method 800 for detecting injection vulnerabilities of client-side templating systems. The flowchart starts at operation 802 by receiving, at data processing hardware 118, a web page request 110 for a web page 200 from a user device 102 associated with a user 10. At operation 804, the method 800 includes determining, by the data processing hardware 118, that the web page 200 implements a interpreted programming language framework 142 with client-side templating. The interpreted programming language may be JavaScript.

At operation 806, the method 800 includes extracting, by the data processing hardware 118, an interpreted programming language framework version 144 of the interpreted programming language framework 142 and interpolation signs 146 from the web page 200. At operation 808, the method 800 also includes generating, by the data processing hardware 118, an attack payload 152a for at least one injection vulnerability context 210 of the web page 200 based on the version 144 of the interpreted programming language framework 142 and the interpolation sign 146. The attack payload 152a may include a validation function 154. The data processing hardware 118 may configure the validation function 154 to validate execution of the validation function 154 to the data processing hardware 118. The data processing hardware 118, when generating the attack payload 152a, may generate a single attack payload 152a that the data processing hardware 118 configures for instrumentation into the web page 200 for each injection vulnerability context 210 of the web page 200. The data processing hardware 118 may extract the interpolation signs 146 by executing the web page 200 to expose an API of the interpreted programming language framework 142. The data processing hardware 118 may then modify the API 412 and intercept a reconfiguration of the interpolation sign 146 using at least the modified API 414.

At operation 810, the method 800 includes instrumenting, by the data processing hardware 118, the web page 200 to inject the attack payload 152a into the at least one injection vulnerability contexts 210 of the web page 200. The data processing hardware 118 may instrument the web page 200 to inject the attack payload 152a by injecting the attack payload 152a into one or more possible input vectors 510 of the web page 200 each associated with a corresponding injection vulnerability context 210. The data processing hardware 118, when instrumenting the web page 200 to inject the attack payload 152a, may generate a separate test case 520 for each possible input vector 510 of the web page 200. The method 800 may also include injecting the attack payload 152a into the respective possible input vector 510 of each test case 520 and executing the instrumented web page 200 for each test case 520. The data processing hardware 118 may prototypical inheritance to inject the attack payload 152a into the possible input vectors 510.

At operation 812, the method 800 includes executing, by the data processing hardware 118, the instrumented web page 200. In some examples, the method 800 also includes, catching, by the data processing hardware 118 a thrown exception 182 triggered by the attack payload 152a during execution of the instrumented web page 200, and identifying, by the data processing hardware 118, a vulnerability 192 of the web page 200 based on the thrown exception 182. The data processing hardware 118 may also catch a response 530 of the validation function 154 triggered by the attack payload 152a during execution of the instrumented web page 200. Thereafter, the data processing hardware 118 may identify a vulnerability 192 of the web page 200 based on the response 530. In some examples, the data processing hardware 118 modifies an exception handler 312 of the interpreted programming language framework 142 to intercept the thrown exception 182. The thrown exception 182 may include a syntax exception 182a.

In some implementations, after identifying the vulnerability 192, the data processing hardware 118 generates a second attack payload 152b based on the version 144 of the interpreted programming language framework 142 and the vulnerability 192 of the web page 200. The second attack payload 152b may include a user notification 642 that indicates (graphically and/or audibly) the vulnerability 192 of the web page 200. The data processing hardware 118 may inject the second attack payload 152b directly into the web page 200 without having to instrument the web page 200 since the vulnerability 192 is already identified. Thereafter, the data processing hardware 118 may transmit the web page 200 having the injected second attack payload 152b to a user device 102 that causes the user device to display the user notification 642 on a user interface 104 executing on the user device 102.

Figure 9:
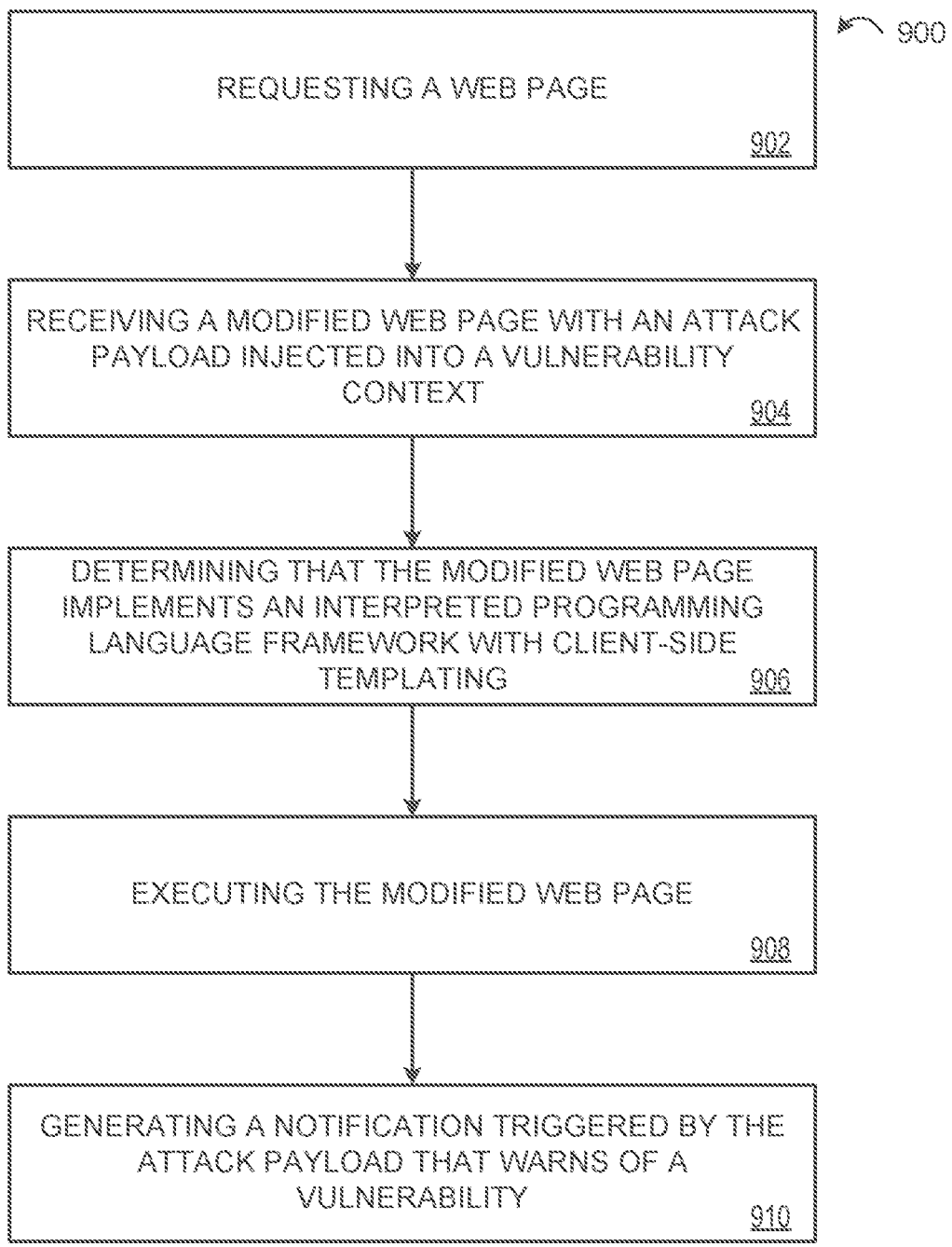
FIG. 9 is a flowchart of another example method for detecting injection vulnerabilities of client-side templating systems.

FIG. 9 is a flowchart of an example method 900 for detecting injection vulnerabilities of client-side templating systems. The flowchart starts at operation 902 by sending, from the data processing hardware 1010, a web page request 110 for the web page 200. At operation 904, the method 900 includes receiving, at the data processing hardware 1010, the web page 200 (i.e., a modified web page 200) with an attack payload 152b injected into a vulnerability context 210 of the web page 200. The attack payload 152b may be based on a version 144 of an interpreted programming language framework 142 (such as JavaScript) and an interpolation sign 146 from the web page 200. The data processing hardware 1010 may inject the attack payload 152b into the vulnerability context 210 of the web page 200 using prototypical inheritance.

At operation 906, the method 900 includes determining, by the data processing hardware 1010, that the web page 200 implements the interpreted programming language framework 142 with client-side templating. At operation 908, the method 900 includes executing, by the data processing hardware 1010, the web page 200. At operation 910, the method 900 includes generating, by the data processing hardware 1010, a notification 642 triggered by the attack payload 152b during execution of the web page 200. The notification 642 indicates a vulnerability 192 of the web page 200 that may be based on the vulnerability context 210.

Figure 10:
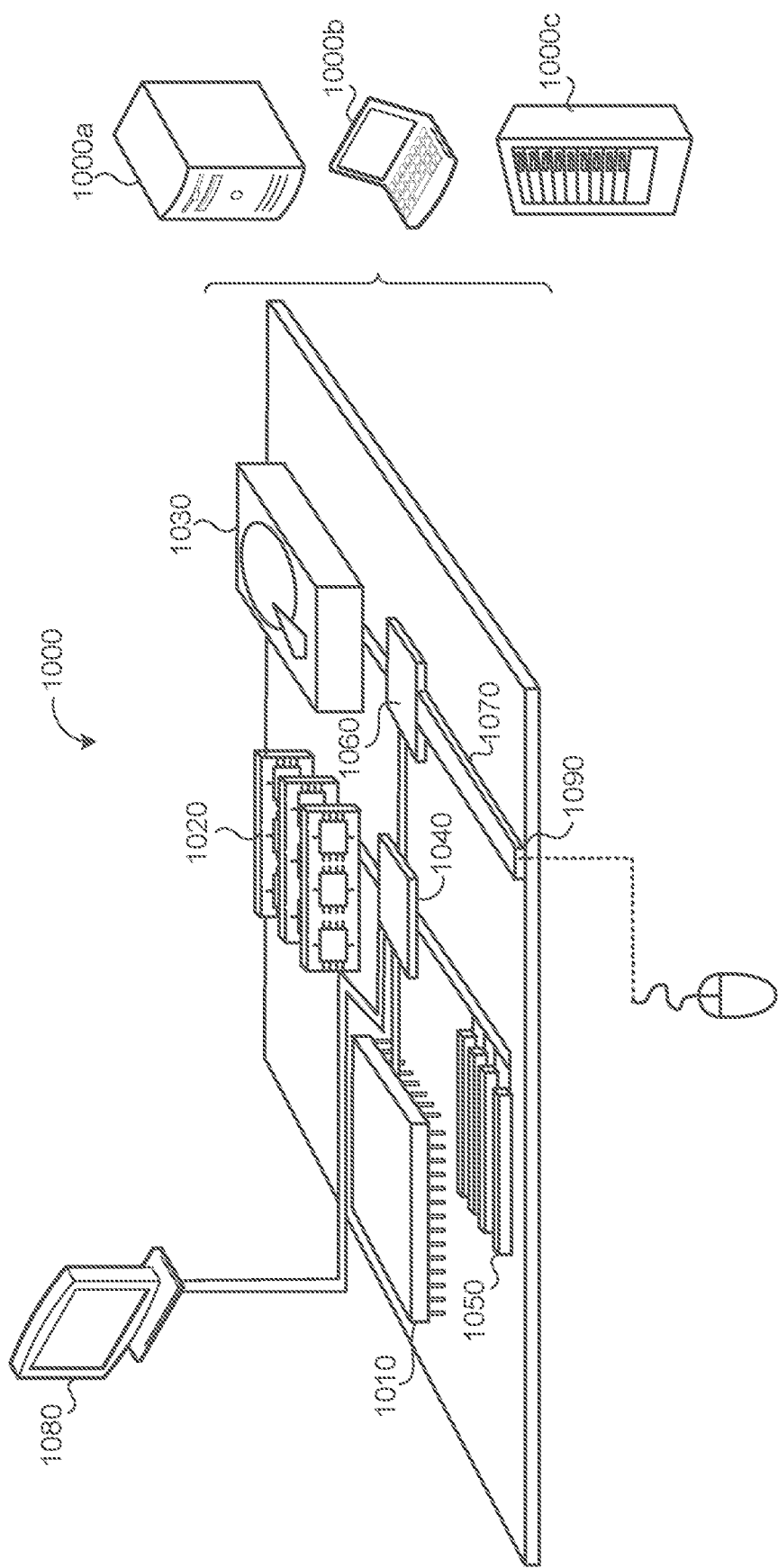
FIG. 10 is a schematic view of an example computing device that may be used to implement the systems and methods described herein.

FIG. 10 is schematic view of an example computing device 1000 that may be used to implement the systems and methods described in this document. The computing device 1000 may be implemented on the remote system 114 and/or the user device 102 of the system 100 of FIG. 1. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010 (e.g., data processing hardware), memory 1020 (e.g., memory hardware), a storage device 1030, a high-speed interface/controller 1040 connecting to the memory 1020 and high-speed expansion ports 1050, and a low speed interface/controller 1060 connecting to a low speed bus 1070 and a storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory hardware 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and a low-speed expansion port 1090. The low-speed expansion port 1090, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1000 may be implemented in a number of different forms, as shown in the figure. For example, it may be implemented as a standard server 500a or multiple times in a group of such servers 1000a, as a laptop computer 1000b, or as part of a rack server system 1000c.

A software application (i.e., a software resource) may refer to computer software that causes a computing device to perform a task. In some examples, a software application may be referred to as an "application;" an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term 'machine-readable signal' refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, a web page;
determining, by the data processing hardware, that the web page implements an interpreted programming language framework with client-side templating;
extracting, by the data processing hardware, a version of the interpreted programming language framework and an interpolation sign from the web page;
generating, by the data processing hardware, an attack payload for at least one injection vulnerability context of the web page based on the version of the interpreted programming language framework and the interpolation sign;
instrumenting, by the data processing hardware, the web page to inject the attack payload into the at least one injection vulnerability context of the web page;
executing, by the data processing hardware, the instrumented web page;
catching, by the data processing hardware, a thrown exception triggered by the attack payload during execution of the instrumented web page; and
identifying, by the data processing hardware, a vulnerability of the web page based on the thrown exception.

2. The method of claim 1, further comprising modifying, by the data processing hardware, an exception handler of the interpreted programming language framework to intercept the thrown exception.

3. The method of claim 1, wherein the thrown exception comprises a syntax exception.

4. The method of claim 1, wherein the attack payload comprises a validation function configured to validate execution of the validation function to the data processing hardware.

5. The method of claim 4, further comprising:
catching, by the data processing hardware, a response of the validation function triggered by the attack payload during execution of the instrumented web page; and
identifying, by the data processing hardware, a vulnerability of the web page based on the response.

6. The method of claim 1, wherein extracting the interpolation sign from the web page comprises:
executing, by the data processing hardware, the web page to expose an Application Programming Interface (API) of the interpreted programming language framework;
modifying, by the data processing hardware, the API; and
intercepting, by the data processing hardware, a reconfiguration of the interpolation sign using at least the modified API.

7. The method of claim 1, wherein generating the attack payload comprises generating, by the data processing hardware, a single attack payload configured for instrumentation into the web page for each injection vulnerability context of the web page.

8. The method of claim 1, wherein instrumenting the web page to inject the attack payload comprises injecting, by the data processing hardware, the attack payload into a possible input vector of the web page.

9. The method of claim 1, wherein instrumenting the web page to inject the attack payload comprises:
generating, by the data processing hardware, a separate test case for each possible input vector of the web page; and
injecting, by the data processing hardware, the attack payload into the respective possible input vector of each test case.

10. The method of claim 9, wherein executing the instrumented web page comprises executing, by the data processing hardware, the instrumented web page for each test case.

11. The method of claim 1, further comprising:
determining, by the data processing hardware, that a vulnerability of the web page is identified during execution of the web page;
based on determining that the vulnerability of the web page is identified during execution of the web page:
generating, by the data processing hardware, a second attack payload based on the version of the interpreted programming language framework and the vulnerability of the web page, the second attack payload comprising a user notification indicating the vulnerability of the web page;
injecting, by the data processing hardware, the second attack payload into the web page; and
transmitting, by the data processing hardware, the web page having the injected second attack payload from the data processing hardware to a user device requesting the web page, the web page when received by the user device, causing the user device to execute the web page and display the user notification on a user interface executing on the user device.

12. The method of claim 1, wherein instrumenting the web page to inject the attack payload comprises injecting, by the data processing hardware, the attack payload using prototypical inheritance.

13. The method of claim 1, wherein the interpreted programming language comprises JavaScript.

14. A system comprising:
data processing hardware; and
memory hardware in communication with the data processing hardware, the memory hardware storing instructions that when executed on the data processing hardware cause the data processing hardware to perform operations comprising:
receiving a web page;
determining that the web page implements an interpreted programming language framework with client-side templating;
extracting a version of the interpreted programming language framework and an interpolation sign from the web page;
generating an attack payload for at least one injection vulnerability context of the web page based on the version of the interpreted programming language framework and the interpolation sign;
instrumenting the web page to inject the attack payload into the at least one injection vulnerability context of the web page;
executing the instrumented web page;
catching a thrown exception triggered by the attack payload during execution of the instrumented web page; and
identifying a vulnerability of the web page based on the thrown exception.

15. The system of claim 14, wherein the operations further comprise modifying an exception handler of the interpreted programming language framework to intercept the thrown exception.

16. The system of claim 14, wherein the thrown exception comprises a syntax exception.

17. The system of claim 14, wherein the attack payload comprises a validation function configured to validate execution of the validation function to the data processing hardware.

18. The system of claim 17, wherein the operations further comprise:
catching a response of the validation function triggered by the attack payload during execution of the instrumented web page; and
identifying a vulnerability of the web page based on the response.

19. The system of claim 14, wherein extracting the interpolation sign from the web page comprises:
executing the web page to expose an Application Programming Interface (API) of the interpreted programming language framework;
modifying the API; and
intercepting a reconfiguration of the interpolation sign using at least the modified API.

20. The system of claim 14, wherein generating the attack payload comprises generating a single attack payload configured for instrumentation into the web page for each injection vulnerability context of the web page.

21. The system of claim 14, wherein instrumenting the web page to inject the attack payload comprises injecting, by the data processing hardware, the attack payload into a possible input vector of the web page.

22. The system of claim 14, wherein instrumenting the web page to inject the attack payload comprises:
generating a separate test case for each possible input vector of the web page; and
injecting the attack payload into the respective possible input vector of each test case.

23. The system of claim 22, wherein executing the instrumented web page comprises executing the instrumented web page for each test case.

24. The system of claim 14, wherein the operations further comprise:
determining that a vulnerability of the web page is identified during execution of the web page;
based on determining that the vulnerability of the web page is identified during execution of the web page:
generating a second attack payload based on the version of the interpreted programming language framework and the vulnerability of the web page, the second attack payload comprising a user notification indicating the vulnerability of the web page;
injecting the second attack payload into the web page; and
transmitting the web page having the injected second attack payload from the data processing hardware to a user device requesting the web page, the web page when received by the user device, causing the user device to execute the web page and display the user notification on a user interface executing on the user device.

25. The system of claim 24, wherein instrumenting the web page to inject the attack payload comprises injecting the attack payload using prototypical inheritance.

26. The system of claim 24, wherein the interpreted programming language comprises JavaScript.

27. A method comprising:
requesting, at data processing hardware, a web page;
receiving, at the data processing hardware, the web page having an attack payload injected into a vulnerability context of the web page;
determining, by the data processing hardware, that the web page implements a interpreted programming language framework with client-side templating;
executing, by the data processing hardware, the web page;
catching, by the data processing hardware, a thrown exception triggered by the attack payload during execution of the web page;
identifying, by the data processing hardware, a vulnerability of the web page based on the thrown exception; and
generating, by the data processing hardware, a notification based on identifying the vulnerability of the web page,
wherein the attack payload is based on a version of the interpreted programming language framework and an interpolation sign from the web page.

28. The method of claim 27, wherein the attack payload is injected into the vulnerability context of the web page using prototypical inheritance.

29. The method of claim 27, wherein the vulnerability is based on the vulnerability context of the web page.

30. The method of claim 27, wherein the interpreted programming language comprises JavaScript.

31. A system comprising:
data processing hardware; and
memory hardware in communication with the data processing hardware, the memory hardware storing instructions that when executed on the data processing hardware cause the data processing hardware to perform operations comprising:
requesting a web page;
receiving the web page having an attack payload injected into a vulnerability context of the web page;
determining that the web page implements a interpreted programming language framework with client-side templating;
executing the web page;
catching a thrown exception triggered by the attack payload during execution of the web page;
identifying a vulnerability of the web page based on the thrown exception; and
generating a notification based on identifying the vulnerability of the web page,
wherein the attack payload is based on a version of the interpreted programming language framework and an interpolation sign from the web page.

32. The system of claim 31, wherein the attack payload is injected into the vulnerability context of the web page using prototypical inheritance.

33. The system of claim 31, wherein the vulnerability is based on the vulnerability context.

34. The system of claim 31, wherein the interpreted programming language comprises JavaScript.

* * * * *